United States Patent [19]

Cearley et al.

[11] Patent Number: 5,247,545

[45] Date of Patent: Sep. 21, 1993

[54] CONTROL BLADE SERVICING ASSEMBLY

[75] Inventors: James E. Cearley; Yuen H. Kong, both of San Jose, Calif.

[73] Assignee: General Electric Company, San Jose, Calif.

[21] Appl. No.: 963,297

[22] Filed: Oct. 19, 1992

[51] Int. Cl.⁵ ............................................. G21C 19/00
[52] U.S. Cl. .................................... 376/260; 83/917; 30/277; 30/286
[58] Field of Search ................. 376/260; 83/917, 930; 30/277, 286, 367; 29/724, 724, 725, 402.08

[56] References Cited

U.S. PATENT DOCUMENTS

| | | | |
|---|---|---|---|
| 4,006,527 | 2/1977 | Sivachenko | 83/917 |
| 4,257,292 | 3/1981 | Faull | 83/146 |
| 4,434,092 | 2/1984 | Mary | 376/260 |
| 4,643,845 | 2/1987 | Omote et al. | 376/260 |
| 4,747,995 | 5/1988 | Bednarik et al. | 376/260 |
| 4,788,027 | 11/1988 | Krieg | 376/260 |

OTHER PUBLICATIONS

Baversten et al., "Replacement of Pins & Rollers on Irradiated Control Rods," ABB Atom Inc., Feb. 1991, pp. cover, 1-6, and FIGS. 1-6.
Asea Atom, "BWR Control Rod Manufacturing," 1987, 4-pages from an apparent brochure.
Morlin et al., "The Ultimate BWR Control Rod," Asea Journal 1-87, pp. cover and 20-22.
ASEA-Atom, "Long Life Control Rods," 1983, 12-pages.
Morlin et al., "Performance Experience of ASEA-Atom BWR Control Blades," ANS Topical Conference, Apr. 21-24, 1985, pp. 5-29 to 5-42.
General Electric Company, excerpt from a proprietary Sep. 19, 1980 drawing 913E398 showing a "Roller Removal Tool" built and used in 1970's at commercial nuclear plants to remove rollers from control rods.

*Primary Examiner*—Daniel D. Wasil
*Attorney, Agent, or Firm*—J. S. Beulick

[57] ABSTRACT

An assembly for servicing a cruciform control blade includes a carriage having first and second crossarms each containing a generally U-shaped slot for receiving the top of the control blade. The first crossarm includes a clamping actuator to rigidly clamp the carriage to the blade top. The second crossarm includes a tool positionable adjacent to a roller aperture in a selected one of the four panels of the control blade. The tool is positioned on the second crossarm at a predetermined depth, and at a predetermined lateral span from the first crossarm so that upon mounting of the carriage on the blade top and actuation of the clamping actuator, the tool is vertically and laterally aligned with a center of the panel roller aperture. In one embodiment, the tool is effective to sever the roller from the panel aperture without damaging the panel, and in another embodiment the tool is effective for installing a replacement spacer pad in the aperture.

15 Claims, 11 Drawing Sheets

CONTROL BLADE SERVICING ASSEMBLY

The present invention relates generally to nuclear reactors, and, more specifically, to an assembly for servicing control blades therein having radioactive rollers and pins.

BACKGROUND OF THE INVENTION

In a nuclear reactor such as a boiling water reactor (BWR), a plurality of control blades or rods are selectively inserted into and withdrawn from a reactor core containing nuclear fuel bundles therein. The fuel bundles are disposed in flow or fuel channels which are spaced apart from each other to define passages through which the control blades may be translated upwardly or downwardly. Exemplary control blades have cruciform cross sections which are disposed in complementary shaped passages between adjacent fuel bundles. As the control blades are translated upwardly and downwardly, they intermittently slide against the fuel channels.

In order to reduce abrasion between the sliding control blades and the fuel channels, the control blades typically include pin-mounted rollers which provide the sole points of contact between the control blades and the fuel channels as the control blades are translated. In order to reduce wear of the rollers and pins themselves, they are typically formed from conventional abrasion resistant materials containing cobalt. However, it has been determined through operation of the reactors that the neutron flux within the reactor core irradiates the rollers and pins causing them to become highly radioactive and brittle. As the rollers and pins wear and corrode during operation, the particles released thereby remain radioactive and are circulated along with the reactor water channeled through the core. These radioactive particles increase the radiation levels of plant equipment through which the water is circulated.

Accordingly, the cobalt content of rollers and pins is being reduced or eliminated in newer reactors to reduce or eliminate the increased radiation due to the radioactive cobalt particles. However, cobalt-containing rollers and pins are presently in service in nuclear reactors, and the replacement of the entire control rod including the cobalt containing rollers and pins joined thereto would appear to be impractical and costly.

Accordingly, removal of the irradiated rollers and pins and replacement thereof is known in the art. For example, electro-discharge machining (EDM) may be used to sever the welded pins from the control blade in order to remove the rollers. Replacement rollers may then be installed with the replacement pin being re-welded to the control blade. However, since servicing of the control blades must necessarily be done underwater, the EDM and welding processes are, therefore, additionally more difficult to accomplish.

In another example, the rollers and pins may be removed and replaced instead with a spacer or guide pad for reducing the difficulty of the servicing operation. However, the spacer pad must be suitably secured to the control blade for extended usage in the reactor. One known guide pad is a one-piece member screwed into the control blade and welded thereto to prevent its removal during operation. However, the welding increases the difficulty of this servicing method and results in heat affected zones in the control blade.

Another example uses a two-piece guide pad which are joined together through the original roller aperture and swaged or cold rolled together to prevent their disassembly during operation. However, cold working of the spacer material also adds to the difficulty of this servicing method and introduces stresses in the material which may lead to failure in operation.

It is also known to remove old rollers and pins without using EDM, but using a more simple process in which a punch shears away the old roller and pin from the control blade. In this example, a single punch is supported by a frame which rests on top of the control blade, with a pair of spaced apart manual clamps clamping the frame to the control rod to position the punch. The punch is generally aligned with one of the rollers so that upon actuation of the hydraulic cylinder which translates the punch, the roller is severed from the control blade. However, the punch and frame are an unbalanced assembly which makes alignment of the punch and roller difficult underwater, and the manual clamps also diminish the ability to obtain accurate alignment. Accordingly, a portion of the control blade itself may also be severed away. This is not a concern where the irradiated rollers are being severed from the control blade for disposing of the control blade after its useful life. Damaging the control blade is a significant concern if it has a remaining useful life and the rollers are to be replaced with spacer pads, for example, for continued operation.

SUMMARY OF THE INVENTION

An assembly for servicing a cruciform control blade includes a carriage having first and second crossarms each containing a generally U-shaped slot for receiving the top of the control blade. The first crossarm includes a clamping actuator to rigidly clamp the carriage to the blade top. The second crossarm includes a tool positionable adjacent to a roller aperture in one of the four panels of the control blade. The tool is positioned on the second crossarm at a predetermined depth, and at a predetermined lateral span from the first crossarm so that upon mounting of the carriage on the blade top and actuation of the clamping actuator, the tool is vertically and laterally aligned with a center of the panel roller aperture. In one embodiment, the tool is effective to sever the roller from the panel aperture without damaging the panel, and in another embodiment the tool is effective for installing a replacement spacer pad in the aperture.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
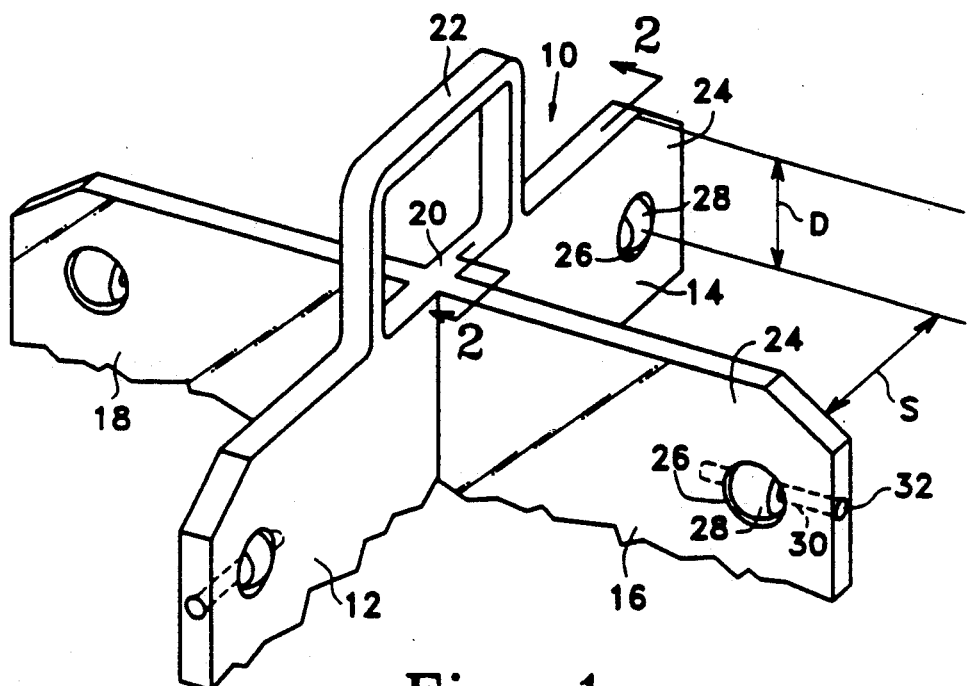
FIG. 1 is a top portion of an exemplary cruciform control blade having four pin mounted rollers at the top thereof.

Illustrated schematically in FIG. 1 is an exemplary cruciform control rod or blade 10 which is effective for conventionally controlling reactivity in a nuclear reactor (not shown). The blade 10 includes first, second, third, and fourth equlangularly spaced apart and intersecting panels 12, 14, 16 and 18, respectively, fixedly joined together in a cruciform configuration. The first and second panels 12, 14 are coplanar in one vertical plane, and third and fourth panels 16, 18 are coplanar in a second vertical plane disposed perpendicularly to the first and second panels 12, 14. The four panels are also joined together to form a coplanar, horizontal top 20 which has a cruciform configuration, with a conventional handle 22 extending upwardly therefrom. Each panel includes an identical top outer corner 24 having an aperture 26 which contains a conventional roller 28 rotatably mounted therein by a conventional pin 30 which is welded at one end to the panel by a weld 32.

Figure 2:
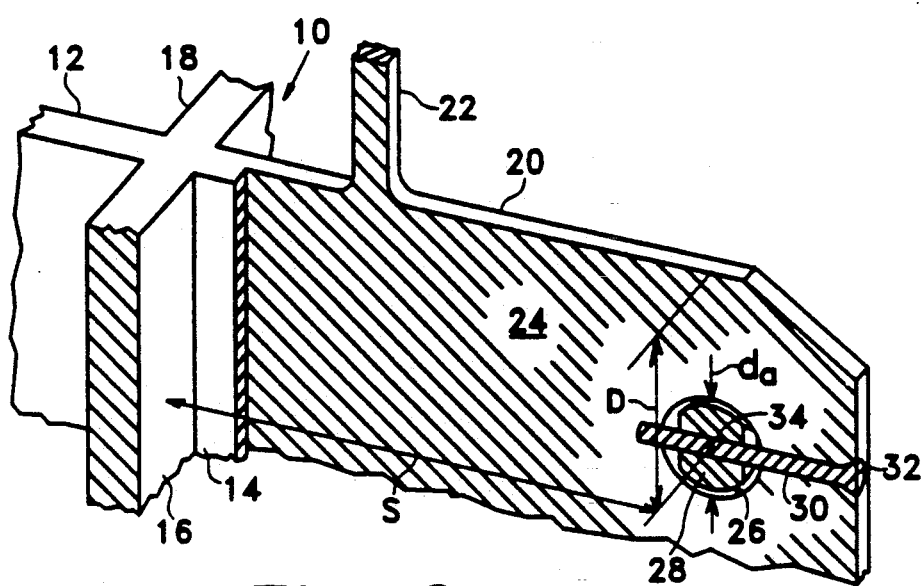
FIG. 2 is an enlarged, partly sectional view of one of the pin mounted rollers in one of the control blade panels shown in FIG. 1.

As shown more particularly in FIG. 2, the panel aperture 26 has a center 34 predeterminedly positioned at a vertical depth D from the blade top 20 and at a predetermined lateral span S from an adjacent panel disposed perpendicularly thereto. In FIG. 2, the center 34 of the aperture 26 of the second panel 14 is spaced perpendicularly outwardly from both the third and fourth panels, 16, 18 at the lateral span S. Since the control blade 10 illustrated in FIG. 1 is symmetrical, the centers of each of the panel apertures 26 are similarly positioned at the lateral span S from the adjacent panels, as well as being similarly disposed at the depth D in the blade top 20. These accurate dimensions D and S are used in accordance with the present invention to accurately position a servicing assembly 36 as shown in FIG. 3 over the blade top 20 for accurately removing each of the rollers 28 for subsequent replacement without damaging the panels 12-18.

Figure 3:
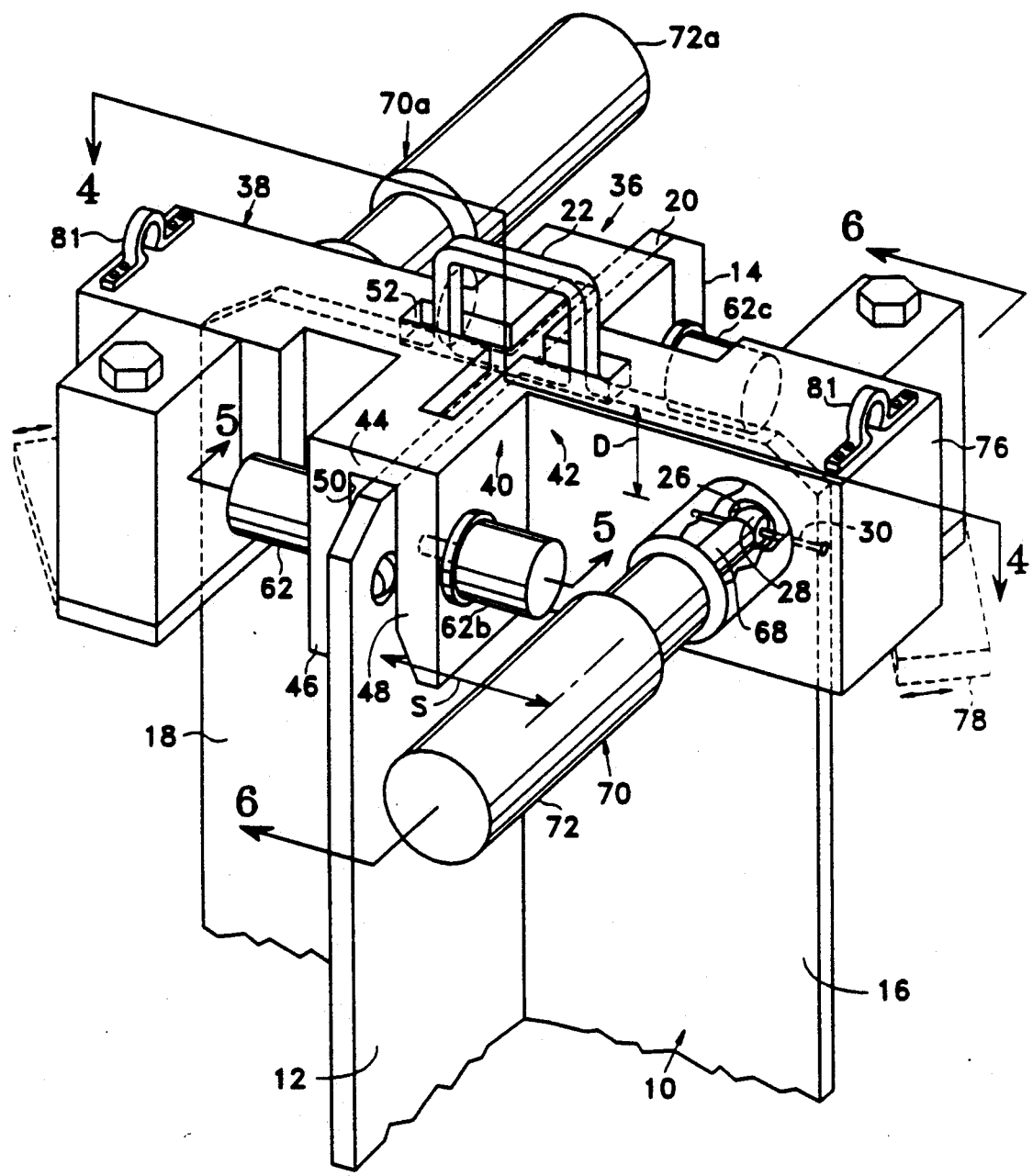
FIG. 3 is a schematic representation of a servicing assembly in accordance with one embodiment of the present invention mounted on the top of the control blade illustrated in FIG. 1.
Figure 4:
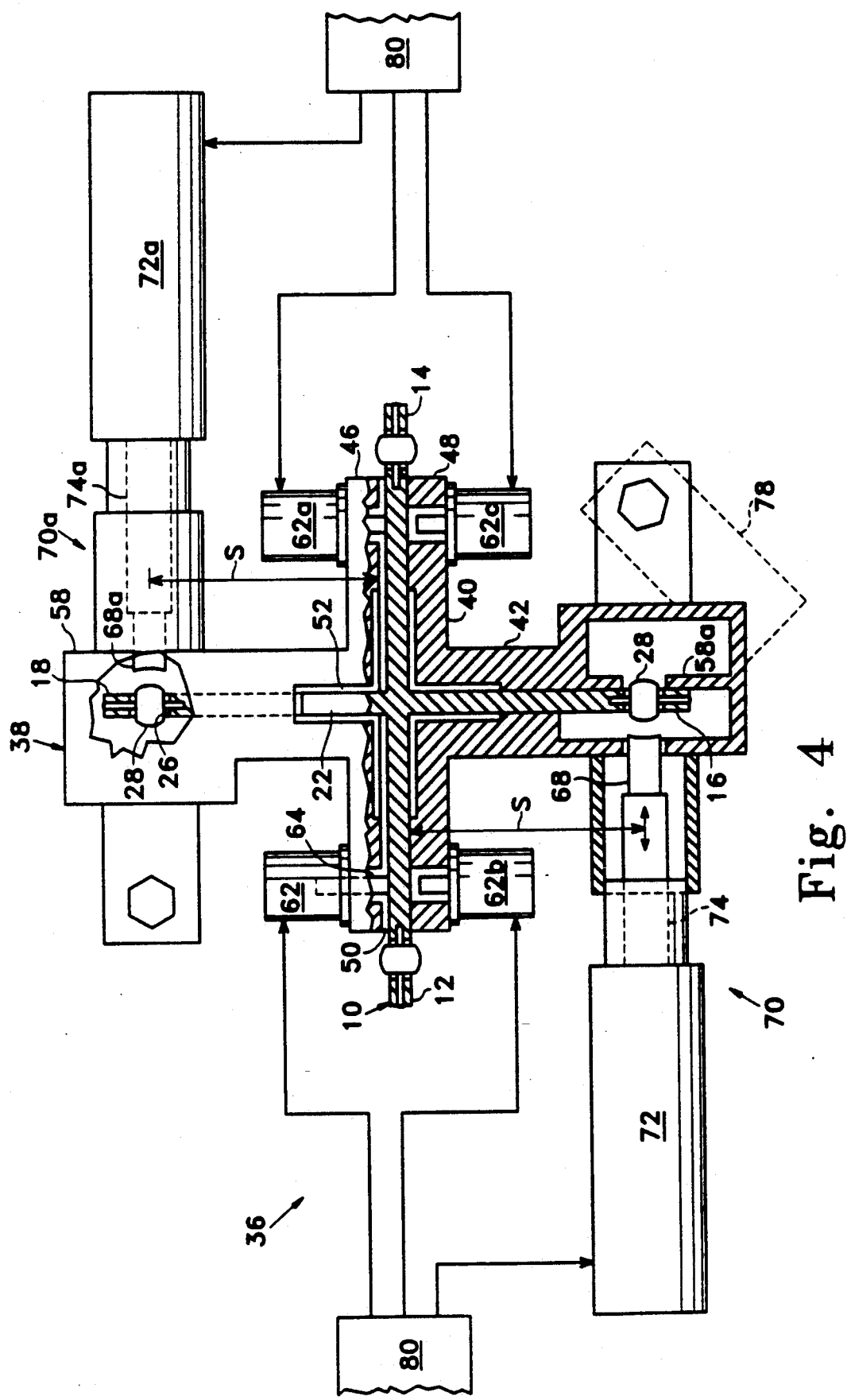
FIG. 4 is a schematic, partly sectional top view of the servicing assembly illustrated in FIG. 3 taken along line 4—4.

More specifically, and referring to FIGS. 3 and 4, the roller removal servicing assembly 36 is shown schematically. The assembly 36 includes a cruciform carriage 38 including a first crossarm 40 disposed perpendicularly to a second crossarm 42 disposed integrally therewith. The first crossarm 40 is shown in more particularity in FIG. 5 and includes a base 44 and first and second legs 46, 48 spaced apart at a width $W_s$ to define a first generally U-shaped slot 50 configured for loosely receiving the first and second panels 12, 14 at the blade top 20. More specifically, each of the panels 12-18 has a thickness T, and the slot width $W_s$ is predeterminedly greater than the thickness T for providing a predetermined clearance C between the first and second panels 12, 14 and the first and second legs 46, 48 for allowing the carriage 38 to be mounted downwardly on the blade top 20 with the slot base 44 resting thereon. As shown more clearly in FIG. 3, the carriage 38 includes a central aperture 52 through which the handle 22 is disposed for allowing the carriage 38 to be mounted on the blade top 20.

Figure 6:
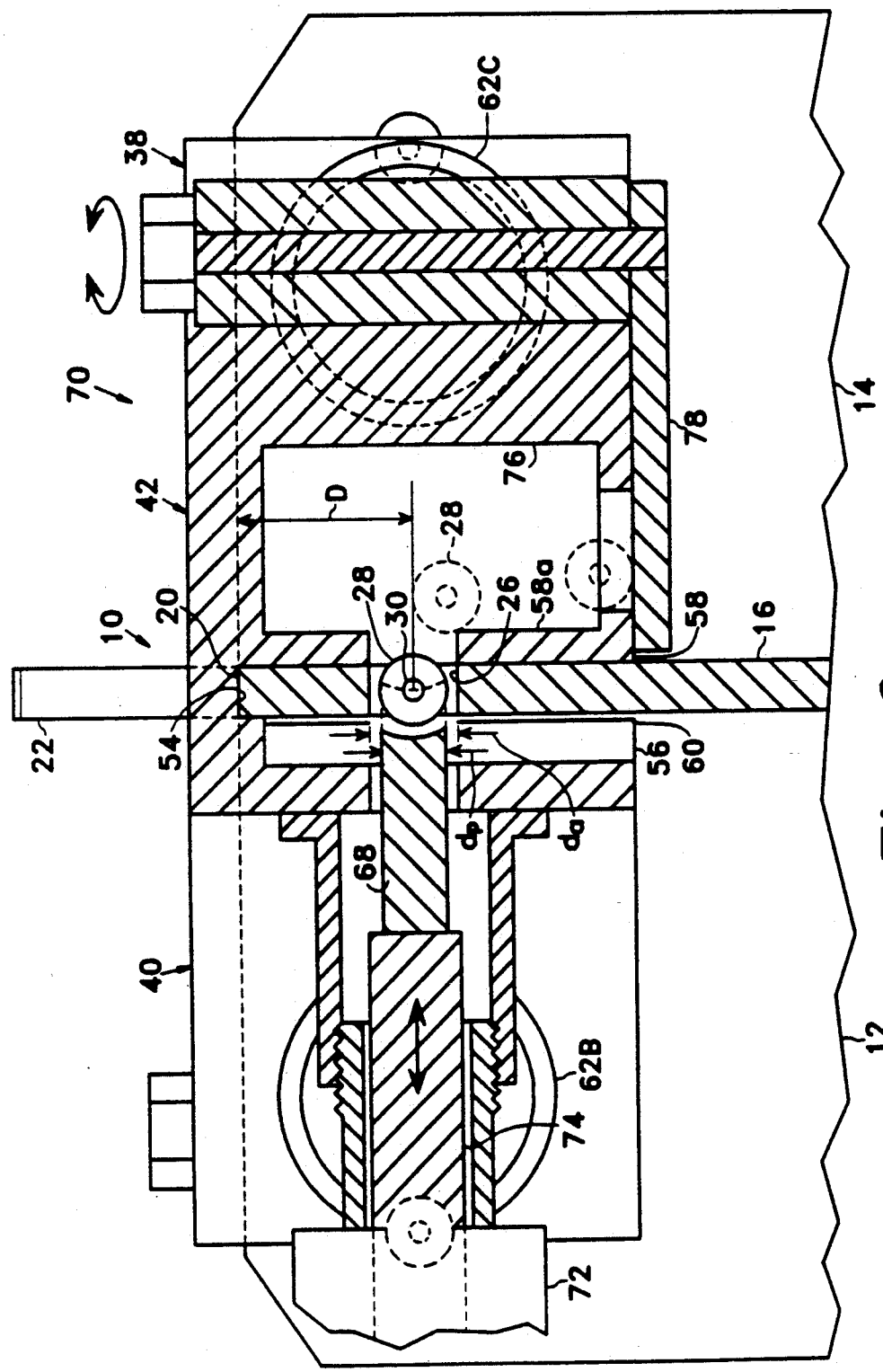
FIG. 6 is a partly sectional, elevational view of the servicing assembly illustrated in FIG. 3 taken along line 6—6.

As shown in FIG. 6, the second crossarm 42 similarly includes a base 54 from which extends first and second legs 56, 58 which are suitably spaced apart to define a second generally U-shaped slot 60 for receiving the third and fourth panels 16, 18 at the blade top 20 on which rests the base 54. The first and second slots 50, 60 provide suitable clearances for allowing the carriage 38 to be readily lowered onto the control blade 10 with the first crossarm 40 being positioned either over the first and second panels 12, 14 as shown in FIG. 3, or over the third and fourth panels 16, 18 as desired for removing all four rollers 28 in turn from the control blade 10. Since the control blade 10 will normally be stored underwater for the servicing operation, the first and second slots 50, 60 allow the carriage 38 to be relatively easily aligned with the respective cruciform panels 12, 18 as it is suitably lowered on the blade top 20 by a conventional hoist or crane (not shown).

Referring again to FIGS. 3 and 5, the first crossarm 40 further includes a first clamping actuator 62 which is fixedly joined to the first leg 46 and has a rod 64, as shown more clearly in FIG. 5, which is selectively translatable through an aperture 66 through the first leg 46 for clamping the first panel 12 against the second leg 48, also as more clearly shown in FIG. 5. The clamping rod 64 is retractable as shown in phantom in FIG. 5 for allowing the carriage 38 to be lowered onto, as the first and second panels 12, 14 are received in the first slot 50; or raised from, the blade top 20 without obstruction from the clamping rod 64, and extendable for contacting the first panel 12 as shown in solid line in FIG. 5 in the first slot 50 to rigidly clamp the carriage 38 to the first panel 12, with the base 44 resting on the blade top 20.

Once the carriage 38 is rigidly and accurately clamped to the blade top 20, servicing of the rollers 28 may begin. More specifically, and referring to FIGS. 3 and 6, the second crossarm 42 in this embodiment includes a first tool 68 in the form of a conventional elongate punch which is positionable adjacent to the aperture 26 of the third panel 16. The first punch 68 is positioned on the second crossarm 42 with its centerline at the predetermined depth D from the base 54 of the second slot 60, as well as from the base 44 of the first slot 50, and at the predetermined lateral span S along the first crossarm 40, i.e., from the first slot 50 of the first crossarm 40, so that upon mounting of the carriage 38 on the blade top 20 and upon clamping of the clamping rod 64, the first punch 68 is both vertically and laterally aligned with the center 34 (see FIG. 2) of the aperture 26 of the third panel 16.

Figure 5:
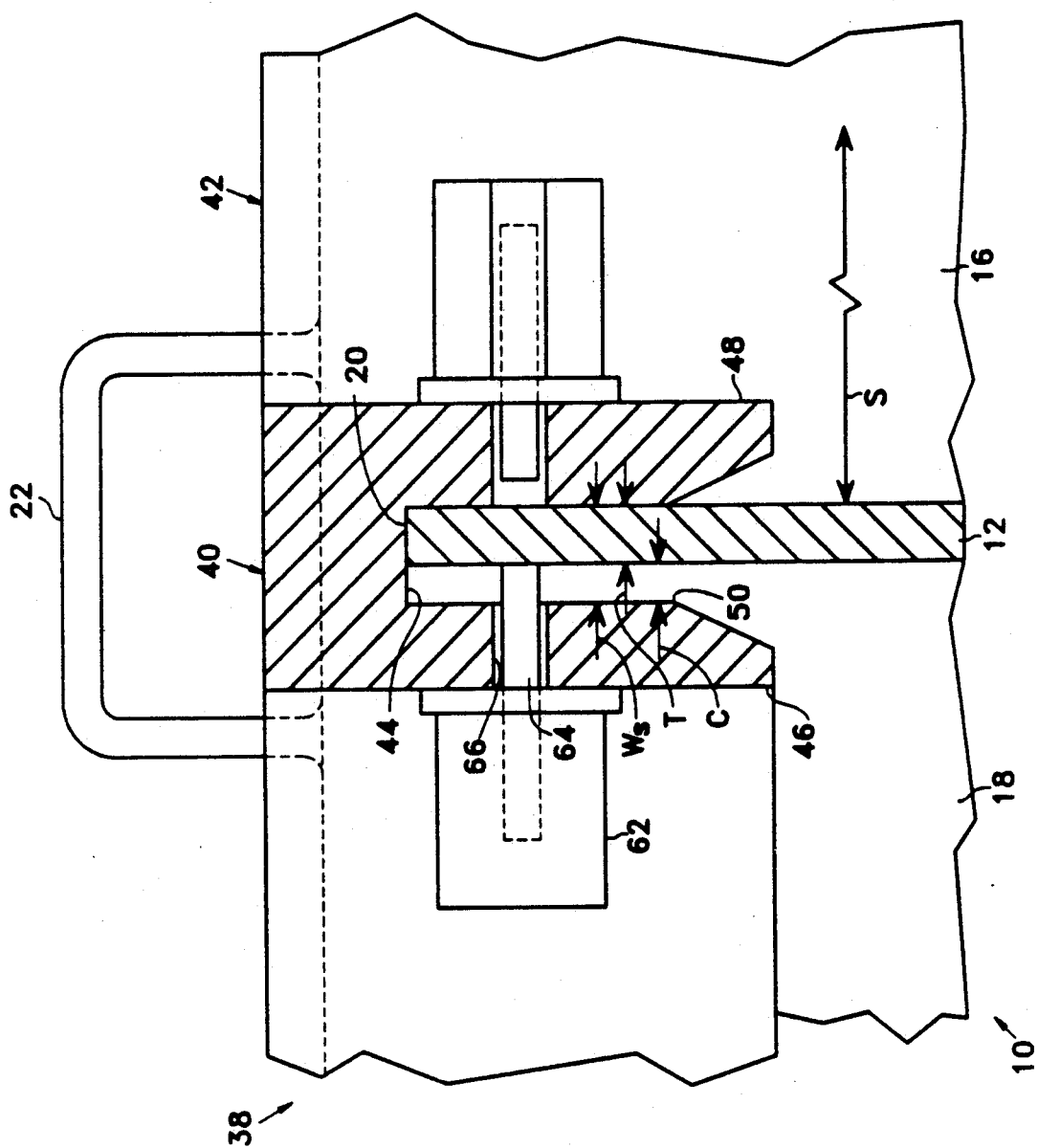
FIG. 5 is a partly sectional, elevation view of a portion of the servicing assembly illustrated in FIG. 3 taken along line 5—5.

FIG. 6 illustrates that the centerline of the first punch 68 is aligned with the center of the aperture 26 at the predetermined depth D, and FIGS. 3 and 5 illustrate that the centerline of the punch 68 is also aligned laterally at the span S with the center of the aperture 26. It is important to accurately align the first punch 68 with the center of the aperture 26 instead of the roller 28 itself since the roller 28 is allowed to slide on the pin 30 and, therefore, it is not necessarily centered within the aperture 26.

Furthermore, the first punch 68 is preferably aligned with the center of the aperture 26 to ensure that when it is translated, it does not contact any portion of the third panel 16 around the aperture 26 which would cause damage thereto which would require further repair of the control blade 10 or its disposal. Since the first and second slots 50, 60 are wider than the thickness of the control panels for allowing mounting of the carriage 38 on the control blade 10, the first clamping actuator 62 in combination with the second leg 48 are provided to not only clamp the carriage 38 to the control blade 10 for the punching operation, but also laterally align the first punch 68 with the center of the aperture 26. As shown in FIGS. 3 and 5, the second leg 48 is predeterminedly spaced at the lateral span S from the centerline of the first punch 68 for laterally aligning the first punch 68 with the center of the aperture 26 of the third panel 16 when the clamping rod 64 urges the first panel 12 against the second leg 48. As shown in FIG. 5, the clamping rod 64 of the first clamping actuator 62 is extended to clamp the first panel 12 against the second leg 48 which, therefore, laterally aligns the centerline of the first punch 68 (see FIG. 3) relative thereto at the lateral spacing S so that the first punch 68 is aligned with the center of the aperture 26 so that the first punch 68 may be used to remove the roller 28 therefrom.

As shown in FIGS. 3 and 6, the first punch 68 is one element of a first punch assembly 70 which further includes a conventional first punch actuator 72 fixedly joined perpendicularly to the second crossarm 42 and having a selectively translatable rod 74 having the first punch 68 fixedly joined to a distal end thereof. As shown in FIG. 6, the first punch 68 has an outer diameter $d_p$ which is preferably less than an inner diameter $d_a$ of the aperture 26 to provide a suitable clearance with the third panel 16 forming the aperture 26 to prevent damage thereto. The depth D is preselected for vertically aligning the first punch 68 with the center of the third panel aperture 26, and the lateral span S is preselected for laterally aligning the first punch 68 (see FIG. 3) with the center of the third panel aperture 26 upon mounting of the carriage 38 to the blade top 20 and clamping of the first panel 12 by the first clamping actuator 62 so that the actuator rod 74 is translatable toward the third panel aperture 26 to impact the roller 28 to shear the pin 30 without contacting the third panel 16. As shown in phantom in FIG. 6, the first punch 68 is translatable to the right to impact the roller 28 which shears the pin 30 which then allows the roller 28 to be ejected from the aperture 26. The irradiated pin 30 is brittle as is conventionally known, and impacting the roller 28 will readily shear the pin 30 for ejecting the roller 28 and the portion of the pin 30 therein from the aperture 26. The remaining portions of the sheared pin 30 may remain in the third panel 16.

Referring again to FIG. 6, the first punch actuator 72 is preferably fixedly joined perpendicularly to the first leg 56 of the second crossarm 42 on one side of the third panel 16. And, on the opposite side of the third panel 16, the second leg 58 includes a portion 58a in the form of a backing plate so that the third panel 16 is positionable between the first punch 68 and the backing plate 58a, with the backing plate 58a being effective for reacting impact load from the first punch 68 against the roller 28 for shearing the pin 30. Although the first punch assembly 70 is generally conventional in structure and in operation to those used for shearing rollers from control blades for purposes of control blade disposal, the added backing plate 58a reduces the liklihood of bending damage to the control blade panel during the punching operation. Since the control blades are being disposed, accuracy of impacting the roller is not a factor in the conventional punch assembly and, therefore, the conventional punch assembly is not required to be accurately positioned which leads to occasional damage of the control panels themselves. However, in accordance with the present invention, the first and second crossarms 40, 42 and the clamping actuators 62 allow the first punch assembly 70 to be more accurately positioned relative to the roller 28 so that actuation of the first punch 68 does not cause damage to the third panel 16.

Referring again to FIG. 6, the first punch assembly 70 may also include a conventional collection housing 76 having a pivotable door 78 at the bottom thereof which is closed for allowing ejected rollers 28 to accumulate in the housing 76, with the door 78 being suitably openable for dumping the collected rollers 28 into a suitable disposal container as is conventionally known.

Referring again to FIG. 4, the servicing assembly 36 is shown as having a conventional power supply and control unit 80 conventionally operatively connected to both the first clamping actuator 62 and the first punch actuator 72. In the exemplary embodiment illustrated in FIG. 4, the first clamping actuator 62 may be a conventional pneumatic or air cylinder selectively provided with air from the unit 80 for extending and retracting the clamping rods 64, and the first punch actuator 72 is a conventional hydraulic cylinder suitably provided with hydraulic fluid from the unit 80 for selectively extending and retracting the actuator rod 74.

Since the punching force required to shear the pin 30 may be substantial, the first clamping actuator 62 is preferably disposed at one end of the first crossarm 40, and the servicing assembly 36 further includes a second clamping actuator 62a disposed at an opposite end thereof so that the first clamping actuator 62 clamps the first panel 12 to the first crossarm 40, and the second clamping actuator 62a clamps the second panel 14 thereto. The second clamping actuator 62a is identical to the first clamping actuator 62 and is similarly operatively joined to the power and control unit 80.

As shown in FIG. 4, when both the first and second clamping actuators 62, 62a are actuated, they clamp the first and second panels 12 and 14, respectively, against the second leg 48 of the first crossarm 40 to laterally align the first punch 68 with the panel aperture 26 of the third panel 16, while rigidly supporting the second crossarm 42 and the first punch actuator 72 so that the first punch 68 may shear the pin 30 through the roller 28 without damaging the third panel 16. The first and second clamping actuators 62, 62a may then be released so that the carriage 38 may be lifted off the control blade 10 rotated in the horizontal plane and reinstalled on the control blade 10 for in turn removing the rollers 28 from the remaining panels.

To improve the accuracy of punch alignment, as well as speed of replacement of the rollers 28, the first punch assembly 70 is preferably disposed at one end of the second crossarm 42 as shown in FIG. 4, and the servicing assembly 36 further includes a second punch assembly 70a disposed at an opposite end of the second crossarm 42. The second punch assembly 70a is identical to the first punch assembly 70 and includes a second punch actuator 72a fixedly joined to the second leg 58 of the second crossarm 42 and includes a selectively translatable actuator rod 74a and a second punch 68a fixedly joined to a distal end thereof.

The servicing assembly 36 further includes a third clamping actuator 62b fixedly joined to the second leg 48 of the first crossarm 40 oppositely to the first clamping actuator 62. A fourth clamping actuator 62c is fixedly joined to the second leg 48 of the first crossarm 40 oppositely to the second clamping actuator 62a. The first leg 46 of the first crossarm 40 is preferably spaced at the lateral span S from the centerline of the second punch 68a for laterally aligning the second punch 68a with the center of the aperture 26 of the fourth panel 18 upon clamping of the first and second panels 12, 14 against the first leg 46 of the first crossarm 40 upon actuation of the third and fourth clamping actuators 62b, 62c.

In this regard, the second punch assembly 70a is identical in structure and function to the first punch assembly 70 except being located on an opposite side of the first crossarm 40. The first and second clamping actuators 62, 62a are actuated to clamp the first and second panels 12, 14 against the second leg 48 of the first crossarm 40 for allowing the first punch 68 to shear the pin 30 holding the roller 28 in the third panel 16, after which the first and second clamping actuators 62, 62a are released and followed in turn by actuation of the third and fourth clamping actuators 62b, 62c which clamp the first and second panels 12, 14 against the first leg 46 of the first crossarm 40 for allowing the second punch 68a to shear the pin 30 holding the roller 28 mounted in the fourth panel 18. The power and control unit 80 provides power to the respective actuators and coordination thereof for removing the rollers 28 from the respective third and fourth panels 16, 18. The carriage 38 may then be suitably lifted, rotated 90° in the horizontal plane, and reinstalled on the control blade 10 so that the actuators 62, 62a, 62b, and 62c in turn clamp the third and fourth panels 16, 18 so that the punches 68, 68a may in turn shear the pins holding the rollers 28 in the first and second panels 12, 14. The servicing assembly 36 may then be removed from the control blade 10, with all of the apertures 26 having their respective rollers 28 removed from the apertures 26 thereof.

As shown in FIGS. 3 and 4, the several components of the assembly 36 are preferably arranged to provide a balanced assembly 36 which will remain substantially horizontal as shown as it is conventionally lowered or raised through the servicing pool containing the control blades 10 being stored for refurbishing. For example, a pair of conventional lifting rings 81 may be suitably fixedly attached to the opposite distal ends of the second crossarm 42 for receiving lifting cables from a conventional crane (not shown).

The two punch actuators 72, 72a preferably extend from opposite sides of the second crossarm 42 to balance the carriage 38 about the vertical plane containing the rings 81. The four actuators 62, 62a, 62b, 62c are also symmetrically positioned on the first crossarm 40 to also provide balance of the carriage 38 about the vertical plane.

Accordingly, the carriage 38 may be more accurately lowered onto the control blade 10, since it remains substantially horizontal under the balanced configuration, which ensures that the blade top 20 will seat fully within the first and second slots 50, 60 prior to clamping by the actuators 62, 62a, 62b, 62c. This is a substantial improvement over the unbalanced conventional single-punch assembly in which accuracy of punch-to-roller alignment was not a concern since damaged blades were nevertheless scrapped.

Figure 7:
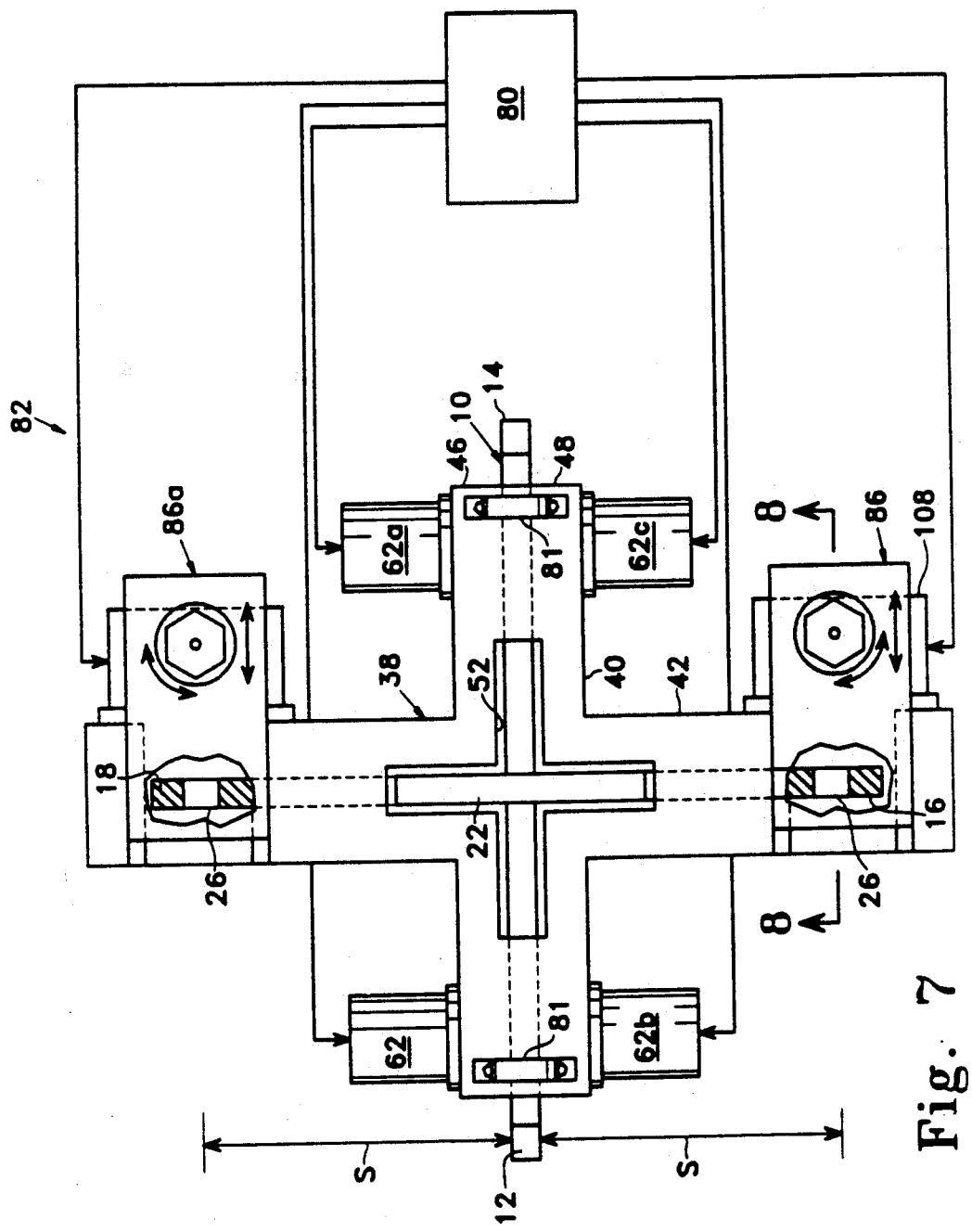
FIG. 7 is a schematic, top view of a servicing assembly in accordance with a second embodiment of the invention mounted on the top of the control blade illustrated in FIG. 1.
Figure 8:
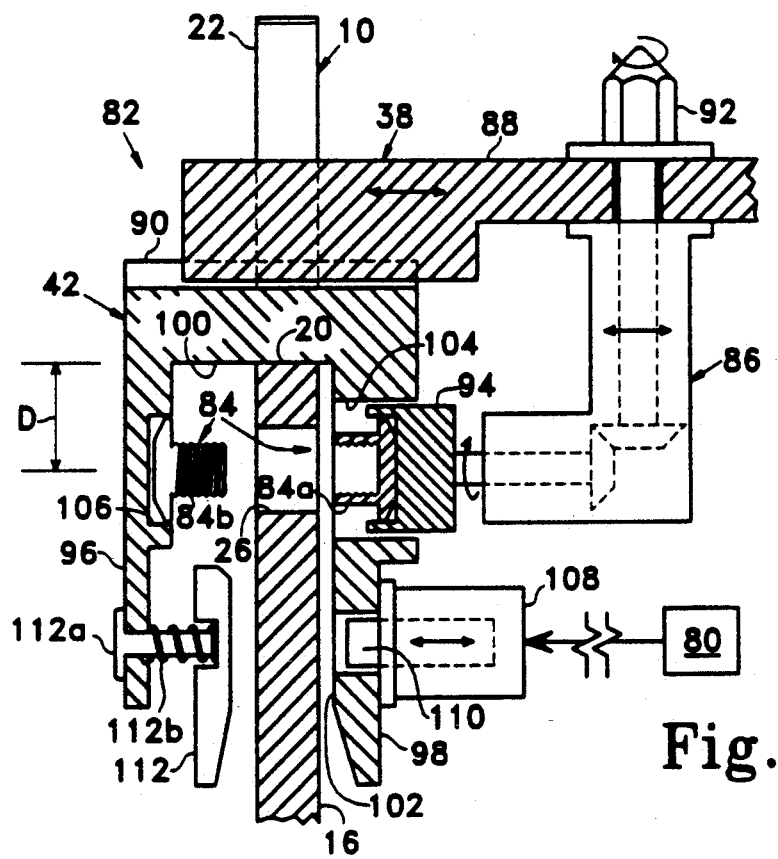
FIG. 8 is a partly sectional, elevational view of the servicing assembly illustrated in FIG. 7 taken along line 8—8 illustrating a spacer pad installation tool shown in a mounting position.

FIGS. 7 and 8 illustrate a second servicing or installation assembly 82 which is used for installing a two-piece spacer pad 84 into each of the apertures 26 of the control blade 10. In this exemplary embodiment, the installation assembly 82 includes a carriage 38 which may be substantially identical to the carriage 38 used in the removal assembly 36 described above. For example, although four clamping actuators 62, 62a, 62b, and 62c are illustrated, only two clamping actuators, e.g. 62, 62b suitably located on opposite sides of the first crossarm 40 may be used instead for similarly clamping the carriage 38 to the control blade 10 since the required clamping forces are substantially less for installing the spacer pad 84 when compared to the forces required for shearing the pin 30 by the punches 68, 68a. Other changes to the carriage 38 may be made as desired.

As shown in FIG. 8, a conventional first right-angle drive 86 is slidably joined to the second crossarm 42 by being mounted on a mounting plate 88 which is slidable on a rail 90 disposed transversely on the top of the second crossarm 42. The first drive 86 has a rotatable drive end 92 in the exemplary form of a hexagonal head which faces upwardly for easy access underwater from the top of the carriage 38. The drive end 92 is operatively joined perpendicularly to a first chuck 94 for rotating the first chuck 94 upon rotation of the drive end 92. In this embodiment, the distal end of the second crossarm 42 includes first and second legs 96, 98 extending from a base 100 and spaced apart to define a second generally U-shaped slot 102 for receiving therein the third panel 16. The second leg 98 has an aperture 104 alignable with the third panel aperture 26 for receiving therethrough the first chuck 94. As shown in FIG. 8, the depth D is preselected for vertically aligning the centerline of the first chuck 94 with the center of the third roller aperture 26 upon mounting of the carriage 38 to the blade top 20 for allowing the first chuck 94 to be translated relative to the rail 90 toward the third panel 16 to insert the spacer pad 84 through the third panel aperture 26.

More specifically, the spacer pad 84 illustrated in FIG. 8 preferably includes first and second mating halves 84a and 84b, with the pad first half 84a including a head and an internally threaded shank, and the pad second half 84b including a head and an externally threaded shank which is complementary to the shank of the first half 84a for being threadingly joined thereto. The first chuck 94 is effective for holding the pad first half 84a for allowing the first drive 86 to join the pad first half 84a to the pad second half 84b through the third panel aperture 26. The first chuck 94 may have conventional grippers for gripping the head of the pad first half 84a, or, for example, may be in the form of a hexagonal socket, with the head of the pad first half 84a having a complementary hexagonal configuration for being inserted and temporarily retained therein. The pad second half 84b is secured in a second chuck 106 disposed in the first leg 96 of the second crossarm 92 oppositely to the aperture 104 in the second leg 98 thereof for holding the pad second half 84b. The second chuck 106 may also have conventional grippers, or may be in the form of a hexagonal socket which receives a hexagonal head of the pad second half 84b for temporary retention therein.

The installation assembly 82 preferably also includes a locking actuator 108 fixedly joined to the second leg 98 of the second crossarm 42 below the first drive 86, and includes a selectively translatable rod 110. The locking rod 110 is retractable for allowing the carriage 38 to be lowered onto the blade top 20 without obstruction therefrom, and is also extendable for contacting the third panel 16 in the second slot 102 to rigidly lock or clamp the third panel 16 against the first leg 96 of the second crossarm 42 and toward the spacer pad second half 84b.

Figure 9:
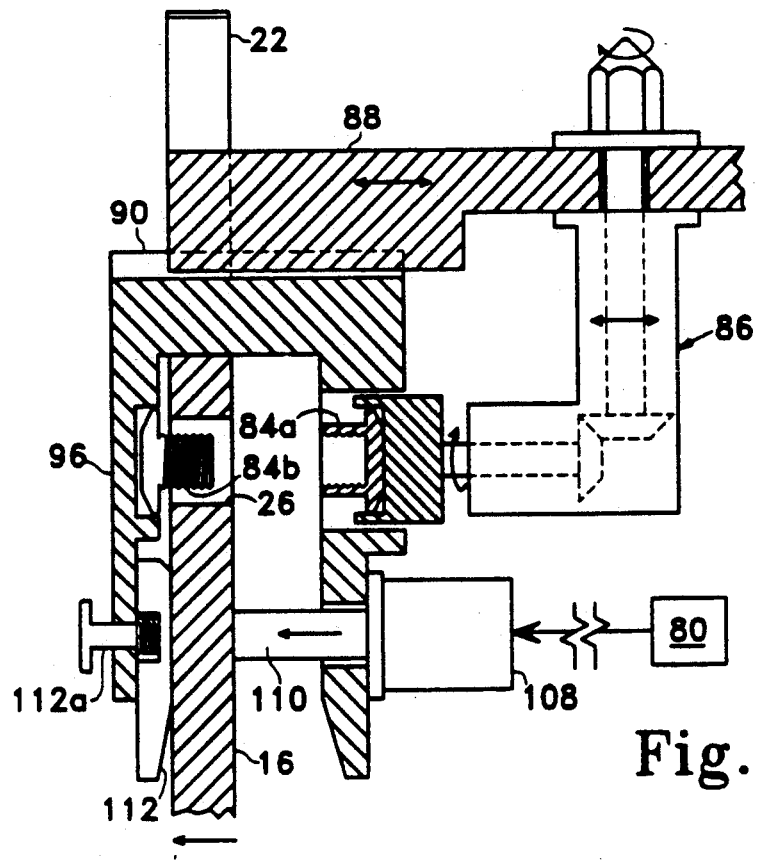
FIG. 9 is a partly sectional, elevational view of the servicing assembly illustrated in FIG. 7 taken along line 8—8 illustrating the spacer pad installation tool shown in a clamping position.
Figure 10:
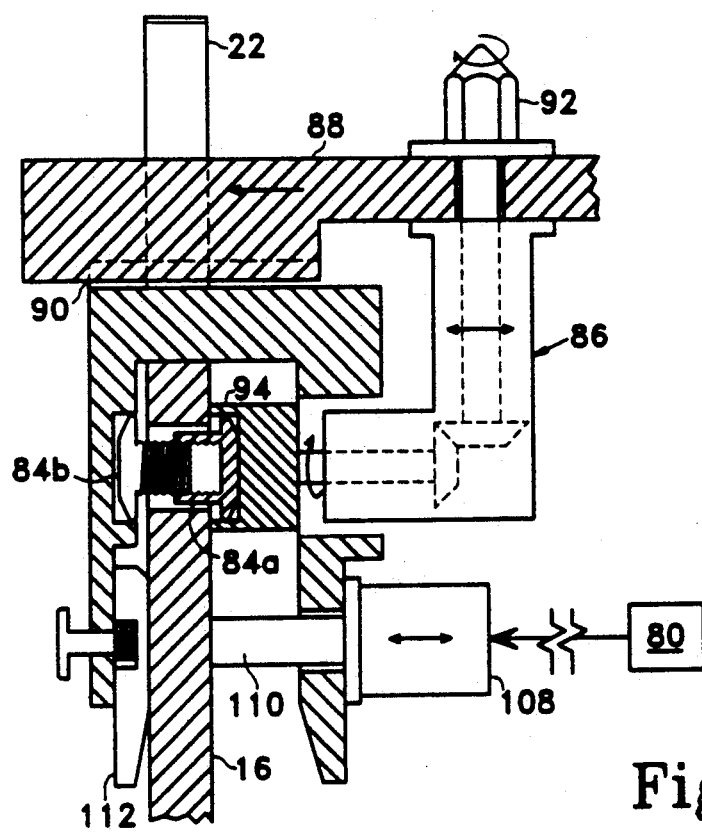
FIG. 10 is a partly sectional, elevational view of the servicing assembly illustrated in FIG. 7 taken along line 8—8 illustrating the spacer pad installation tool shown in a driving position.
Figure 11:
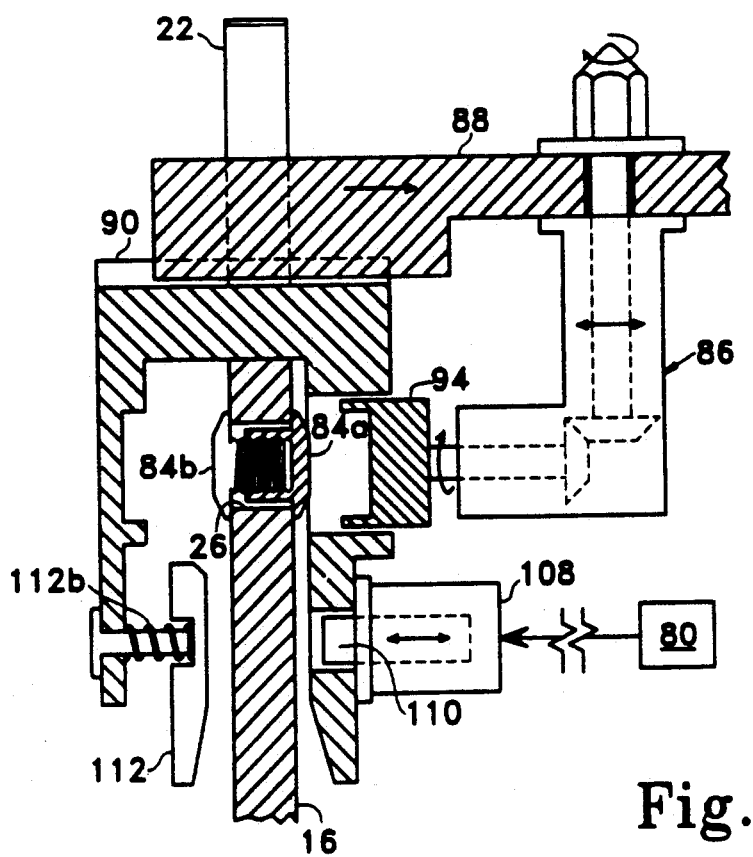
FIG. 11 is a partly sectional, elevational view of the servicing assembly illustrated in FIG. 7 taken along line 8—8 illustrating the spacer pad installation tool shown in an unmounting position.

As also shown in FIG. 8, a bumper 112 is resiliently mounted to the first leg 96 in the second slot 102 below the second chuck 106 and oppositely to the locking rod 110 for deflecting the third panel 16 from contacting the spacer pad second half 84b upon mounting of the carriage 38 to the blade top 20. For example, the bumper 112 includes a retention pin 112a with a compression spring 112b therearound to bias the bumper 112 toward the first leg 98 and to block vertical movement upwardly toward the spacer pad second half 84b. FIG. 8 shows the initial mounting placement of the carriage 38 on the control blade 10, with the third panel 16 being guided into position between the bumper 112 and the second leg 98. In FIG. 9, the locking actuator 108 is actuated by the power and control unit 80 for extending rod 110 to clamp the third panel 16 against the bumper 112 as it bottoms out on the first leg 96. The shank of the pad second half 84b is then disposed inside the third panel aperture 26. In the next installation step illustrated in FIG. 10, the first drive 86 is manually translated to the left by sliding the mounting plate 88 on the rail 90 so that the spacer pad first half 84a is brought in contact and alignment with the spacer pad second half 84b. This is preferably done manually, and then the drive end 92 is manually rotated for rotating the first chuck 94 which in turn rotates the pad first half 84a into threading engagement with the pad second half 84b until the two halves are fully threadingly joined and torqued together. The first drive 86 is then manually translated to the right as shown in FIG. 11, and the locking actuator 108 is de-energized for retracting the locking rod 110 which allows the compression spring 112b to return the bumper 112 to its original position upon release of the clamping actuators 62. The two pad halves 84a and 84b are then fully joined together through the third panel aperture 26 for completing the installation of the spacer pad 84. The installation assembly 82 may then be removed from the control blade 10.

As shown in FIG. 7, the installation assembly 82 preferably includes a second right-angle drive 86a with a corresponding first chuck in an identical configuration with the first drive 86 and the first chuck 94. In this way, once the replacement spacer pad 84 is installed in the aperture 26 of the third panel 16, the first and second clamping actuators 62, 62a may be released for releasing the first and second panels 12, 14 from the second leg 48 of the first crossarm 40, and in turn the third and fourth clamping actuators 62b, 62c may be energized for clamping the first and second panels 12, 14 against the first leg 46 of the first crossarm 40 for aligning the center of the aperture 26 of the fourth panel 18 at the lateral spacing S with the centerline of the respective chuck joined to the second drive 86a. The installation of another spacer pad 84 into the fourth panel aperture 26 may then be identically accomplished. And then the third and fourth clamping actuators 62b, 62c may be de-energized so that the carriage 38 may be lifted from the control blade 10, rotated 90° in a horizontal plane, and reinstalled on the control blade 10 for installing identical spacer pads 84 in the apertures 26 of the first and second panels 12, 14.

In the embodiment illustrated in FIG. 7, the lifting rings 81 are fixedly joined to opposite ends of the first crossarm 40 to provide a substantially balanced assembly 82, with the drives 86, 86a being spaced equidistantly from opposite sides of the first crossarm 40. The rings 81 could alternatively be joined to the opposite ends of the second crossarm 42, in which case the drives 86, 86a would preferably extend oppositely from the opposite sides of the second crossarm 42 instead of in the same direction for balancing the assembly 82. Or, in both assemblies 36, 82 described above, four of the lifting rings 81 could be used, with a respective one being disposed at each of the four ends of the first and second crossarms 40, 42 for preventing horizontal tilting of the carriage 38 as it is lowered onto the control blade 10 to improve alignment accuracy.

Figure 12:
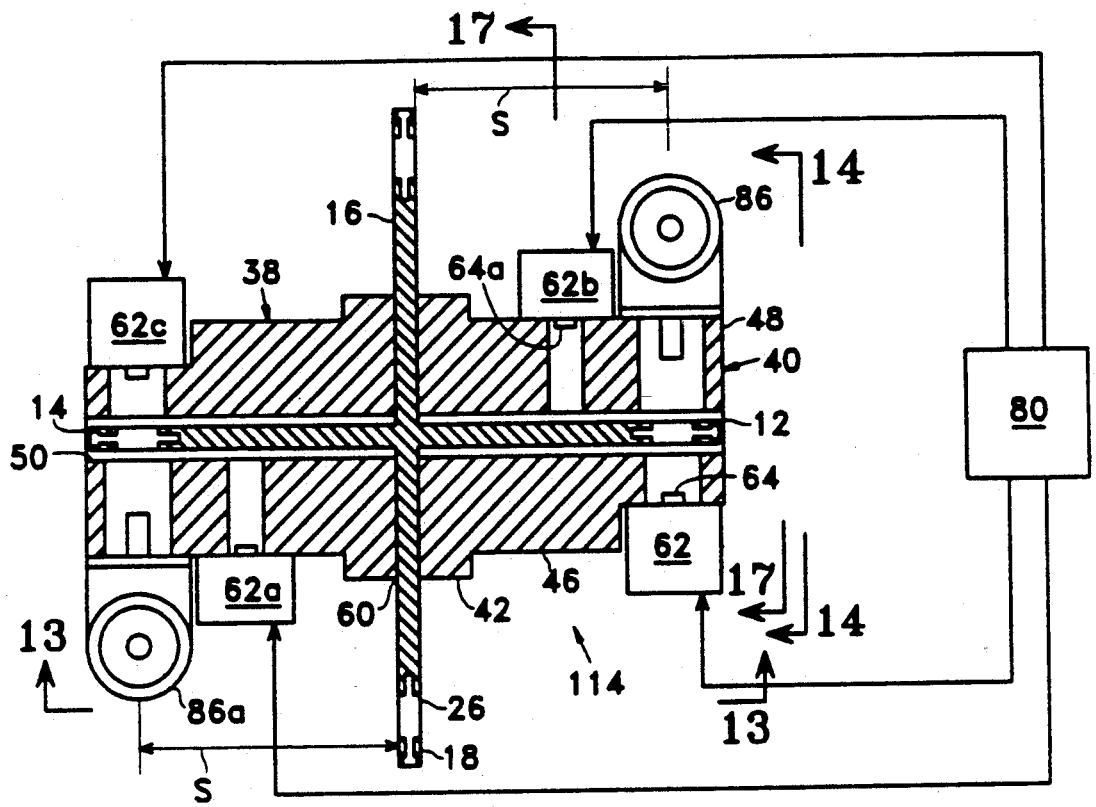
FIG. 12 is a schematic, top view of a servicing assembly in accordance with a third embodiment of the invention mounted on top of the control blade illustrated in FIG. 1.

Illustrated schematically in FIG. 12 is yet another, third embodiment of a servicing, or spacer pad installation assembly 114 which shares many similarities with the first and second embodiments disclosed above and, therefore, uses the same reference numerals for substantially similar components. In the installation assembly 82 illustrated in FIGS. 7-11, the right-angle drives 86, 86a are effective to both rotate the chucks 94 while the plate 88 slides on rails 90 for translating the chucks 94 to insert the spacer pad first half 84a through the panel aperture 26 for threading engagement with the spacer pad second half 84b. And, the bumper 112 is provided to guide the third panel 16 into the slot 102 without contacting the second spacer pad 84b.

Figure 13:
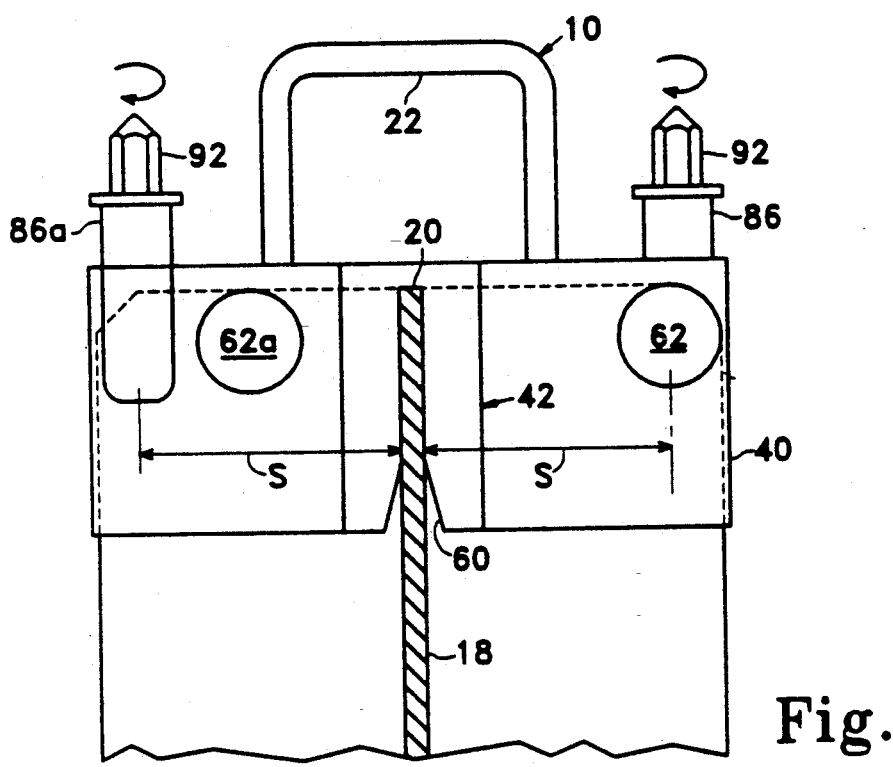
FIG. 13 is a partly sectional, elevational view of the servicing assembly illustrated in FIG. 12 taken along line 13—13.
Figure 14:
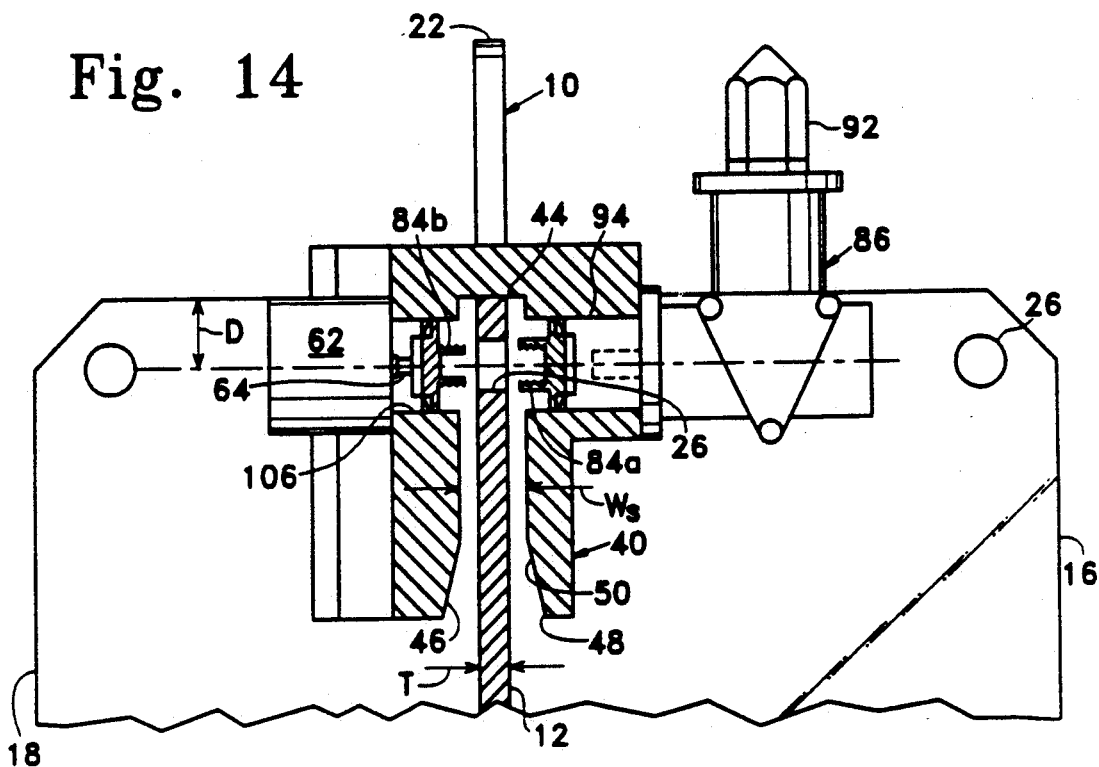
FIG. 14 is a partly sectional, elevational view of the servicing assembly illustrated in FIG. 12 taken along line 14—14.
Figure 15:
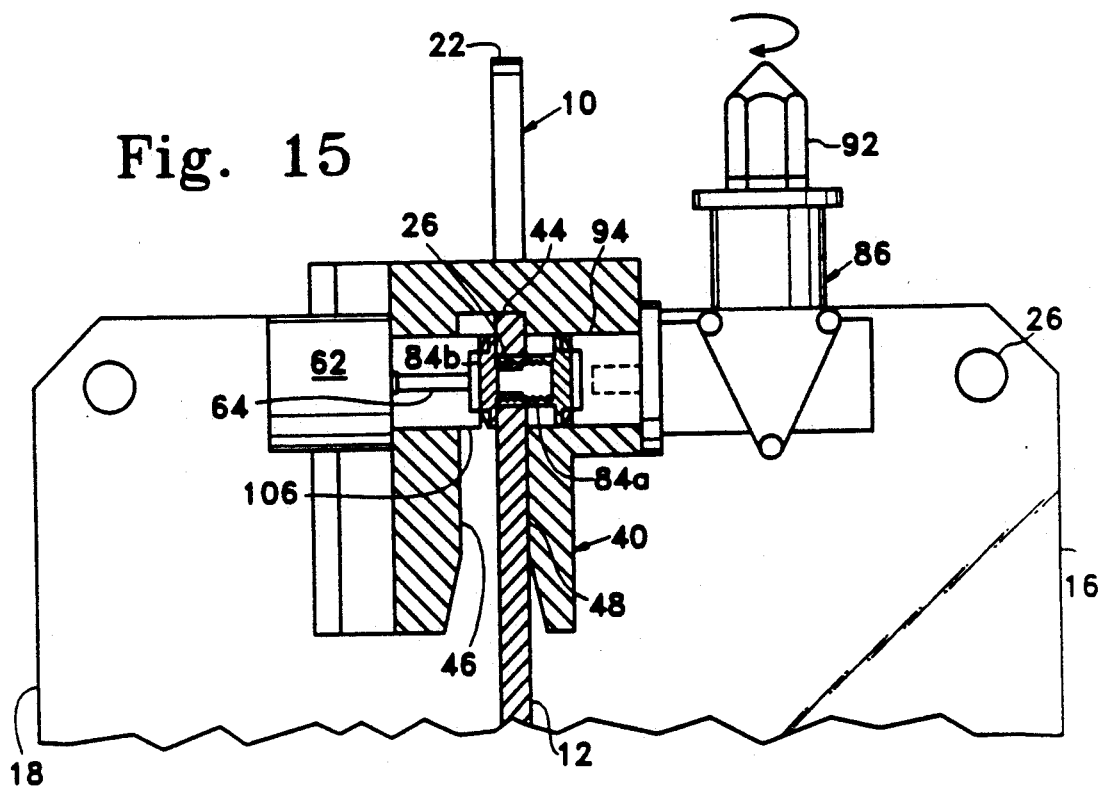
FIG. 15 is a partly sectional, elevational view similar to FIG. 14 which illustrates operation of a clamping actuator.
Figure 16:
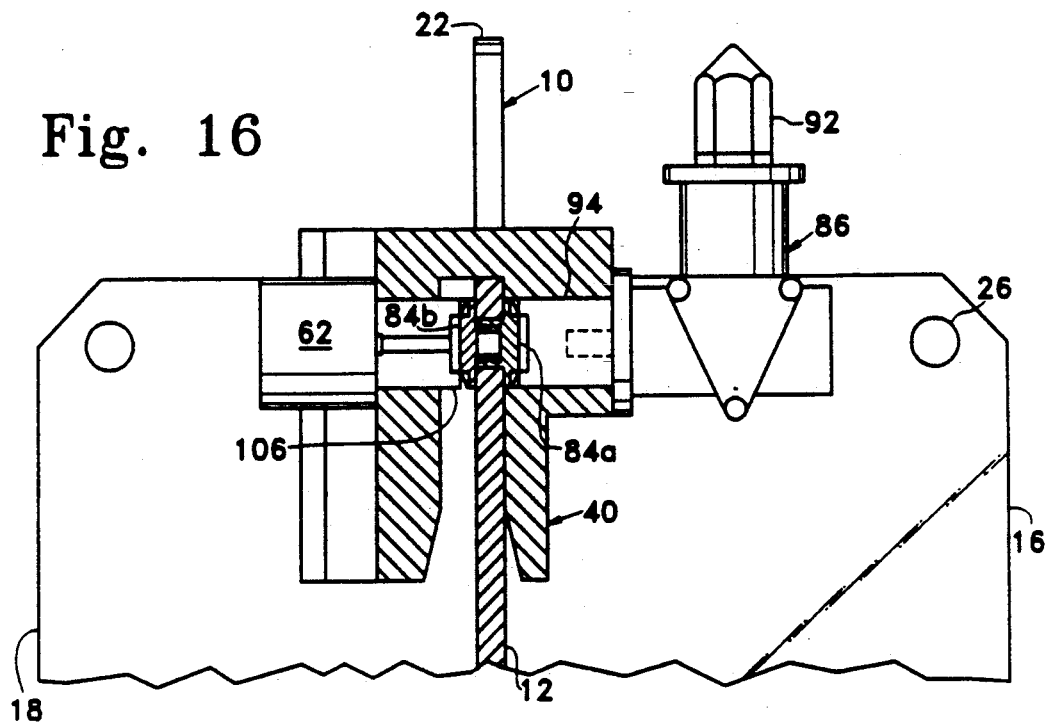
FIG. 16 is a partly sectional, elevational view similar to FIG. 15 which illustrates operation of a right-angle drive for joining together halves of a spacer pad through a panel of the control blade.

The installation assembly 114 illustrated in FIGS. 12-17 instead has the right-angle drives 86, 86a fixedly joined to the first crossarm 40, and operable for both rotating the first chuck 94 while simultaneously translating it and the spacer pad first half 84a toward the first panel 12 to screw the spacer pad first half 84a into threaded engagement with the spacer pad second half 84b through the first panel aperture 26 as shown in the two sequential steps illustrated in FIGS. 15 and 16. To obtain both rotation and translation, the right angle drives 86, 86a may use any conventional mechanism including a threaded output rod joined to the chuck 94 for translating the chuck 94 as it rotates.

In order to reduce the total required translation of the chuck 94 toward the first panel 12, the right-angle drive 86 is fixedly joined to the second leg 48 of the first crossarm 40 oppositely to the first clamping actuator 62 and aligned therewith as illustrated in FIG. 14. And, the first clamping actuator 62 further includes the second chuck 106 fixedly joined to the distal end of the clamping rod 64. The second chuck 106 holds the spacer pad second half 84b, with the clamping rod 64 being extendable, or translatable, to insert the spacer pad second half 84b into the first panel aperture 26 and clamp the first panel 12 against the second leg 48 as illustrated in FIG. 15. The second chuck 106 holds the head of the second spacer pad 84b and upon extension of the clamping rod 64 the head of the pad second half 84b contacts the first panel 12 and displaces the first panel 12 until it contacts the second leg 48 against which it is thusly clamped by operation of the first clamping actuator 62 as illustrated in FIG. 15. In this way, the first panel 12 is moved more closely to the pad first half 84a held by the first chuck 94 which, therefore, reduces the translation travel required by the first chuck 94 for threading the pad first half 84a into the pad second half 84b. FIG. 16 illustrates the two pad halves 84a, 84b fully threaded together through the first panel 12, after which the first clamping actuator 62 is released for withdrawing the second chuck 106 away from the first panel 12.

Figure 17:
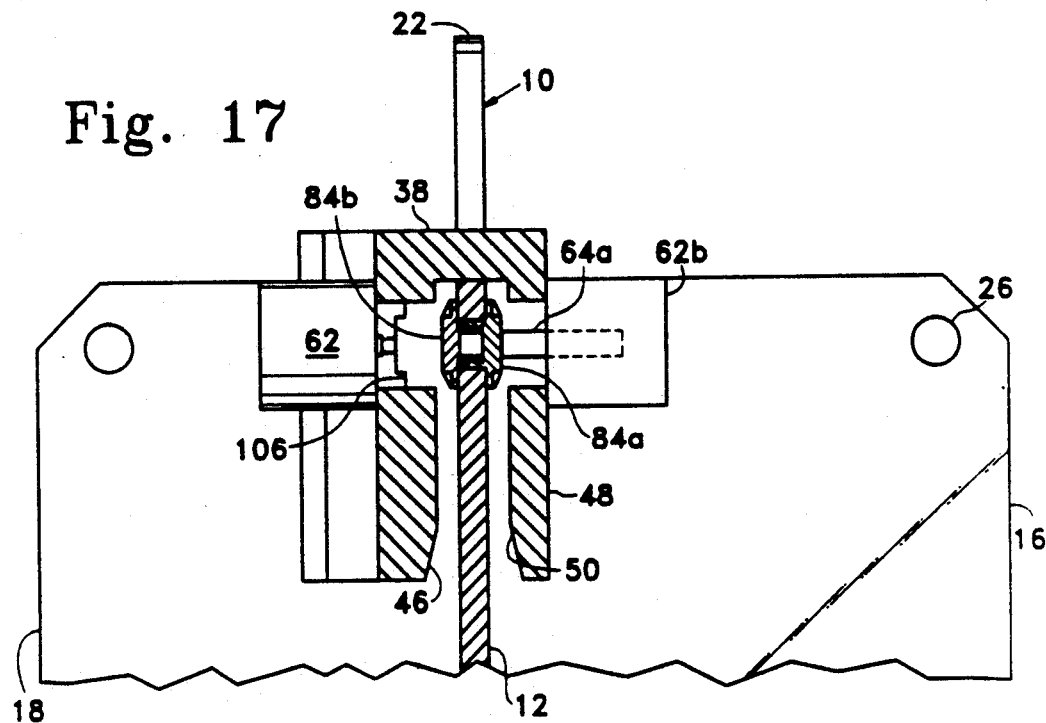
FIG. 17 is a partly sectional, elevational view of the servicing assembly illustrated in FIG. 12 taken along line 17—17 which illustrates operation of a release actuator for centering the control blade panel.

However, the first chuck 94 is still engaged with the pad first half 84a and cannot be displaced therefrom by simply reverse rotation of the first chuck 94 which would tend to rotate the pad first half 84a still joined thereto. Accordingly, a release actuator, which in this exemplary embodiment is also the third clamping actuator 62b as shown in FIGS. 12 and 17 has a translatable output rod 64a which is selectively extendable as shown in FIG. 17 for displacing the first panel 12 away from the second leg 48 in the first slot 50 to center therein the first panel 12 for allowing the carriage 38 to be lifted upwardly therefrom without obstruction from the first crossarm 40 or the first chuck 94. By pushing the first panel 12 away from the second leg 48, the first chuck 94 is disengaged from the spacer pad half 84a which allows the carriage 38 to be removed without obstruction.

Referring again to FIG. 12, the right-angle drive 86 is preferably disposed at one end of the first crossarm 40 and aligned with the first clamping actuator 62 disposed on an opposite side of the first crossarm 40 with the first panel 12 being disposed therebetween. The second clamping actuator 62a is disposed at the opposite end of the first crossarm 40 so that the first clamping actuator 62 clamps the first panel 12 to the second leg 48 of the first crossarm 40 as the second clamping actuator 62a clamps the second panel 14 against the second leg 48 of the first crossarm 40. The third clamping actuator 62b, or release actuator, is disposed adjacent to the right-angle drive 86 on the first leg 48 of the first crossarm 40. And, similarly, the second right-angle drive 86a is disposed adjacent to the second clamping actuator 62a on the first leg 46 of the first crossarm 40. And, the fourth clamping actuator 62c is disposed on the second leg 48 of the first crossarm 40 oppositely to the second right-angle drive 86a and aligned therewith for creating a symmetrical configuration.

More specifically, the first and third clamping actuators 62, 62b and the first right-angle drive 86 are configured and operate as above described to initially clamp the first panel 12 against the first crossarm second leg 48 as illustrated in FIG. 15; then join together the spacer pad first and second halves 84a, 84b as illustrated in FIG. 16; and then center the first panel 12 away from the first chuck 94 for allowing the carriage 38 to be removed as illustrated in FIG. 17. The second and fourth clamping actuators 62a, 62c and the second right-angle drive 86a operate identically for clamping the second panel 14 against the first crossarm second leg 48 for threadingly engaging another spacer pad 84 through the second panel 14, and then centering the second panels 14 within the first slot 50 for allowing the carriage 38 to be removed without obstruction. The operation of the several actuators is suitably effected and coordinated by the control unit 80.

As shown in FIG. 14, the first chuck 94 and the spacer pad first half 84a are accurately positioned in vertical alignment with the panel aperture 26 by being vertically aligned at the predetermined depth D from the slot base 44. And, as shown in FIGS. 12 and 13, the second slot 60 is suitably sized for receiving the third and fourth panels 16 and 18 with a relatively small clearance so that the respective chucks 94 of both the first and second right-angle drive 86, 86a may be accurately laterally aligned with the respective panel apertures 26 at the lateral spacing S.

The removal servicing assembly 36 and the installation servicing assemblies 82, 114 described above use substantially identical carriages 38 which allow for relatively easy mounting of the carriage 38 to the control blade 10, with actuation of the clamping actuators then providing alignment of either the punches 68, 68a or the first chucks 94. The accurate alignment of the punches 62, 62a with the rollers 28 ensures effective shearing of the brittle mounting pins 30 therein without damaging the adjacent panel material during the removal process. Since shearing is effectively accomplished by the removal assembly 36, EDM is no longer required for removing the rollers from the control blades 10 which improves the removing process.

Since the installation assemblies 82, 114 utilize the two piece spacer pad 84 which is threadingly joined together, underwater welding or cold roll forming operations are not required for joining the spacer pad 84 to the control blade 10 in the apertures 26. Installation time is, therefore, reduced, and the potential for cracking the spacer pad 84 due to cold working is eliminated, and the potential for contamination with radioactive material is also eliminated.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. An assembly for servicing a cruciform control blade having first, second, third, and fourth equiangularly spaced apart and intersecting panels joined together to form a coplanar top, each panel including a top outer corner having an aperture for containing a roller rotatably mountable therein by a pin comprising:

a carriage including a first crossarm having a first generally U-shaped slot configured for receiving said first and second panels at said blade top, and a second crossarm disposed perpendicularly to said first crossarm and having a second generally U-shaped slot configured for receiving said third and fourth panels at said blade top;

said first crossarm further including a first clamping actuator fixedly joined thereto and having a selectively translatable rod, said clamping rod being retractable for allowing said carriage to be lowered onto said blade top without obstruction therefrom as said first and second panels are received in said first slot, and extendable for contacting said first panel in said first slot to rigidly clamp said carriage to said first panel at said blade top;

said carriage further including a first tool positionable adjacent to said aperture of a selected one of said panels; and said first tool being positioned on one of said first and second crossarms at a predetermined depth D in said first and second slots and at a predetermined lateral span S along said one crossarm so that upon mounting of said carriage on said blade top and upon clamping of said clamping rod, said first tool is vertically and laterally aligned with a center of said selected panel aperture.

2. A servicing assembly according to claim 1 wherein:

said first crossarm includes a base and first and second legs spaced apart at a width to define said first slot, said slot width being predeterminedly greater than a thickness of said first and second panels for providing a clearance between said first and second panels and said first and second legs for allowing said carriage to be mounted on said blade top with said base resting on said blade top; and said first clamping actuator is fixedly joined to said first leg, with said clamping rod being selectively translatable through an aperture therethrough for clamping said first panel against said second leg.

3. A servicing assembly according to claim 2 wherein:

said selected panel is said third panel; and said first tool is disposed on said second crossarm, and is positionable adjacent to said third panel aperture at said predetermined depth D from a base of said second slot and said second leg is spaced at said lateral span S from said first tool for laterally aligning said first tool with said third panel aperture center.

4. A servicing assembly according to claim 3 wherein said first tool is a first punch of a first punch assembly, said first punch assembly further comprising:

a first punch actuator fixedly joined to said second crossarm and including a selectively translatable rod having said first punch fixedly joined to a distal end thereof, said first punch having an outer diameter less than an inner diameter of said third panel aperture;

said depth D being preselected for vertically aligning said first punch with said third panel aperture center, and said span S being preselected for laterally aligning said first punch with said third panel aperture center upon mounting of said carriage to said blade top and clamping of said first panel by said first clamping actuator so that said first punch actuator rod is translatable toward said third panel aperture to impact said roller to shear said pin without contacting said third panel.

5. A servicing assembly according to claim 4 wherein:

said second crossarm includes first and second legs extending from said base thereof and spaced apart to define said second slot, said first punch actuator being fixedly joined to said first leg thereof, and said second leg thereof including a portion in the form of a backing plate so that said third panel is positionable between said first punch and said backing plate, with said backing plate being effective for reacting impact load from said first punch against said roller for shearing said pin.

6. An assembly according to claim 5 wherein said first clamping actuator is disposed at one end of said first crossarm, and further including a second clamping actuator disposed at an opposite end thereof so that said first clamping actuator clamps said first panel to said first crossarm and said second clamping actuator clamps said second panel thereto.

7. A servicing assembly according to claim 6 wherein said first punch assembly is disposed at one end of said second crossarm, and further including:

a second punch assembly disposed at an opposite end of said second crossarm and having a second punch actuator fixedly joined to said second leg of said second crossarm, said second punch actuator including a selectively translatable rod and a second punch fixedly joined to a distal end thereof;

a third clamping actuator fixedly joined to said second leg of said first crossarm oppositely to said first clamping actuator;

a fourth clamping actuator fixedly joined to said second leg of said first crossarm oppositely to said second clamping actuator; and said first leg of said first crossarm being spaced at said lateral span S from said second punch for laterally aligning said second punch with said aperture center of said fourth panel upon clamping of said first and second panels against said first leg of said first crossarm upon actuation of said third and fourth actuators.

8. A servicing assembly according to claim 3 wherein said first tool is a first chuck of an installation assembly for installing a spacer pad through said third panel aperture, said installation assembly further comprising:

a right-angle drive slidably joined to said second crossarm and having a rotatable drive end operatively joined perpendicularly to said first chuck for rotating said first chuck; and said depth D being preselected for vertically aligning said first chuck with said third roller aperture center upon mounting of said carriage to said blade top for allowing said first chuck to be translated toward said third panel to insert said spacer pad through said third panel aperture.

9. A servicing assembly according to claim 8 wherein:

said second crossarm includes first and second legs extending from said base thereof and spaced apart to define said second slot for receiving therein said third panel, said second leg thereof having an aperture alignable with said third panel aperture for receiving therethrough said first chuck.

10. A servicing assembly according to claim 9 wherein said spacer pad includes first and second mating halves, and said installation assembly further comprises:

a second chuck disposed in said first leg of said second crossarm oppositely to said aperture in said second leg thereof for holding said spacer pad second half; and said first chuck is effective for holding said spacer pad first half for allowing said right-angle drive to join said spacer pad first half to said spacer pad second half through said third panel aperture.

11. A servicing assembly according to claim 10 wherein said installation assembly further comprises:

a locking actuator fixedly joined to said second leg of said second crossarm and having a selectively translatable rod, said locking rod being retractable for allowing said carriage to be lowered onto said blade top without obstruction therefrom, and extendable for contacting said third panel in said second slot to rigidly lock said third panel against said first leg of said second crossarm and toward said spacer pad second half; and a bumper resiliently mounted to said first leg of said second crossarm in said second slot below said second chuck and oppositely to said locking rod for deflecting said third panel from contacting said spacer pad second half upon mounting of said carriage to said blade top.

12. A servicing assembly according to claim 2 wherein said first tool is a first chuck of an installation assembly for installing a spacer pad through said selected panel aperture, said installation assembly further comprising:

a right-angle drive fixedly joined to said first crossarm and having a rotatable drive end operatively joined to said first chuck for rotating said first chuck; and said depth D being preselected for vertically aligning said first chuck with said selected panel aperture center upon mounting of said carriage to said blade top for allowing said first chuck to be rotated toward said selected panel to insert said spacer pad through said selected panel aperture.

13. A servicing assembly according to claim 12 wherein:

said selected panel is said first panel;

said right-angle drive is fixedly joined to said second leg of said first crossarm oppositely to said first clamping actuator and aligned therewith;

said spacer pad includes first and second mating halves;

said first clamping actuator further includes a second chuck fixedly joined to a distal end of said clamping rod thereof and effective for holding said spacer pad second half, said clamping rod being extendable to insert said spacer pad second half into first panel aperture and to clamp said first panel against said second leg; and said first chuck is effective to hold said spacer first half for allowing said right-angle drive to screw said first half into threaded engagement with said second half through said first panel aperture.

14. A servicing assembly according to claim 13 further including:

a release actuator fixedly joined to said second leg of said first crossarm adjacent to said right-angle drive and including an output rod selectively extendable for displacing said first panel away from said second leg in said first slot to center therein said first panel for allowing said carriage to be lifted upwardly therefrom without obstruction from said first crossarm.

15. A servicing assembly according to claim 14 wherein said first clamping actuator is disposed at one end of said first crossarm, and further including a second clamping actuator disposed at an opposite end thereof so that said first clamping actuator clamps said first panel to said first crossarm and said second clamping actuator clamps said second panel thereto.

* * * * *